United States Patent [19]
Deiss et al.

[11] 3,889,273
[45] June 10, 1975

[54] APPARATUS FOR DIAGNOSING A TECHNICAL OBJECT, ESPECIALLY A MOTOR VEHICLE

[75] Inventors: Hans-Dieter Deiss, Gifhorn; Erich Spengler; Gerard Georges, both of Wolfsburg, all of Germany

[73] Assignee: Volkswagenwerk Aktiengesellschaft, Wolfsburg, Germany

[22] Filed: Oct. 4, 1973

[21] Appl. No.: 403,478

Related U.S. Application Data
[63] Continuation of Ser. No. 167,287, July 29, 1971, abandoned.

[30] Foreign Application Priority Data
July 29, 1970 Germany............................ 2037531

[52] U.S. Cl............ 346/33 R; 73/117; 200/61.58 R; 340/27 R
[51] Int. Cl. ............................................. G01d 1/00
[58] Field of Search............. 346/17, 33 R; 200/157, 200/61.58; 340/147 R, 147 P, 147 A, 27 R, 22; 35/9 A, 9 B, 8 R, 8 A, 10, 11; 73/117; 360/72, 12; 40/28.1, 53 A, 86 R, 32; 325/111, 118; 180/1 R

[56] References Cited
UNITED STATES PATENTS

| | | |
|---|---|---|
| 2,718,628 | 9/1955 | Bartlett et al..................... 340/27 R |
| 3,194,895 | 7/1965 | Treadwell............................ 360/72 |
| 3,299,534 | 1/1967 | Schlafly................................ 35/9 R |
| 3,439,534 | 4/1969 | Pilgrim................................. 73/117 |
| 3,538,622 | 11/1970 | Zadig.................................. 35/9 A |

Primary Examiner—Joseph W. Hartary
Attorney, Agent, or Firm—Ernest F. Marmorek

[57] ABSTRACT

An apparatus for performing the diagnostic checking of a technical object, such as a motor vehicle, according to a predetermined list or program, comprising a manually operable portable control device comprising a checking point identification carrier, a plurality of signal keys, at least a pair of signal keys associated with a state of the particular checking position, a transmitting device coupled to the keys, an information storage device remotely displaced but coupled to the control device, the checking point information carrier in synchronism with a corresponding print-out device in the information storage device for recording the information delivered by the keys, the check point information carrier being switched in synchronism with the switching of the recording print-out in the information storage device when the keys are depressed to report the result of the checking.

7 Claims, 11 Drawing Figures

INVENTORS:
Hans-Dieter Deiss
Erich Spengler
Gerard Georges
BY
THEIR ATTORNEY

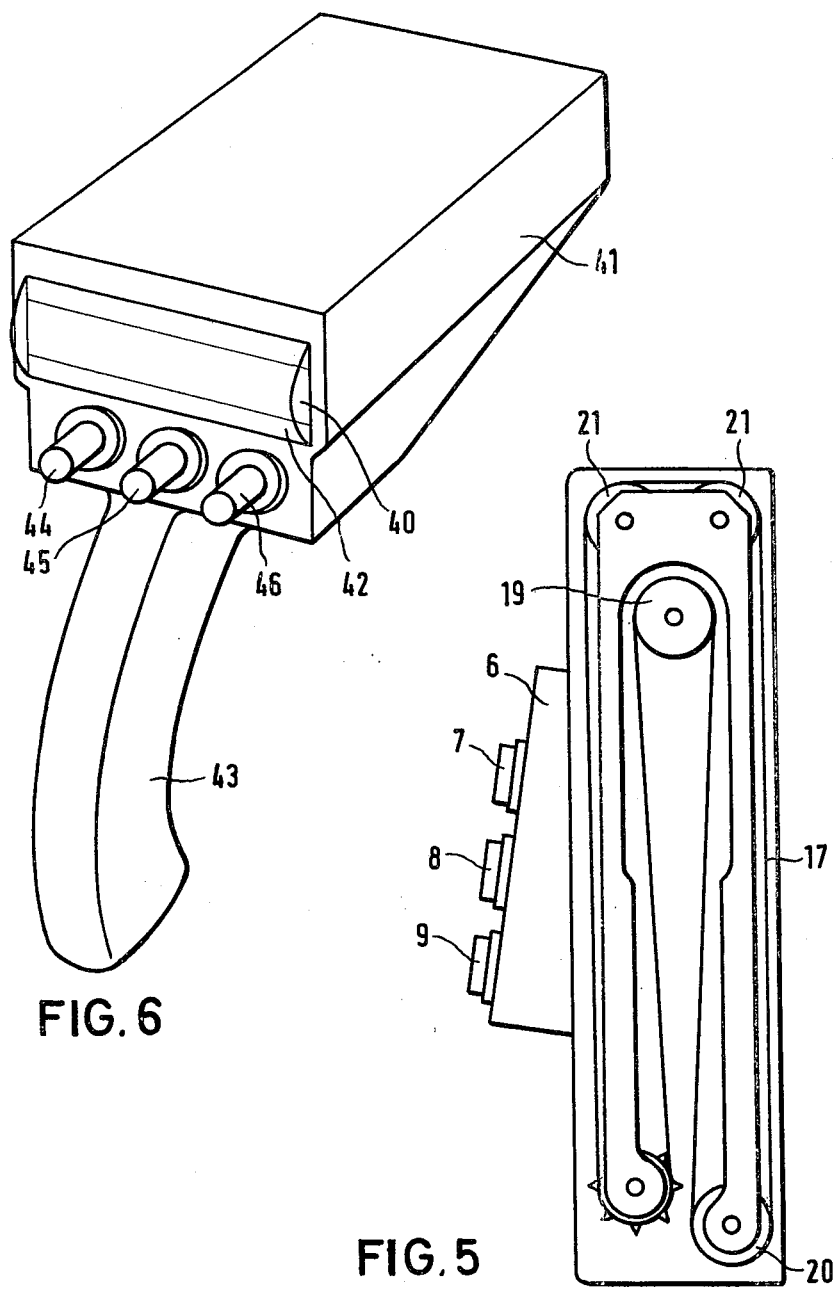

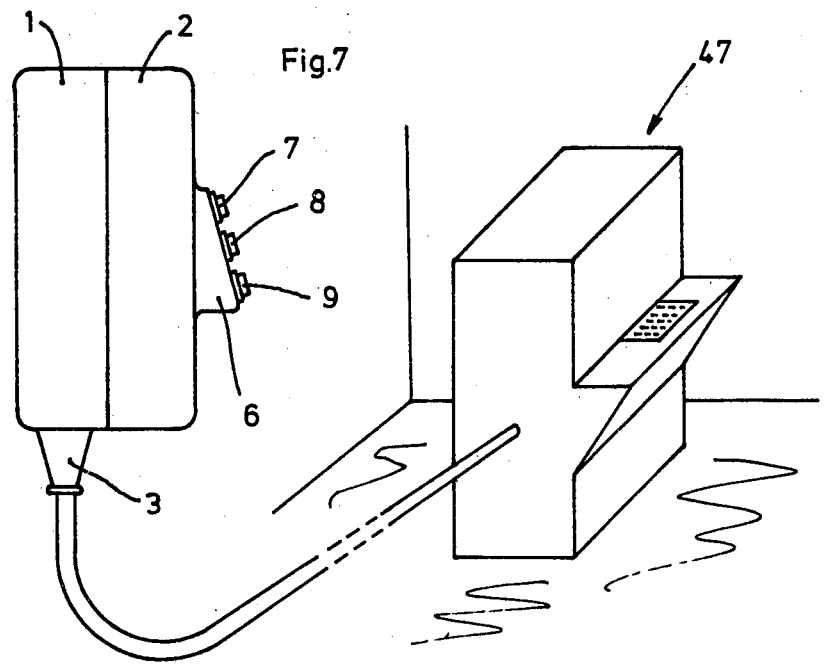
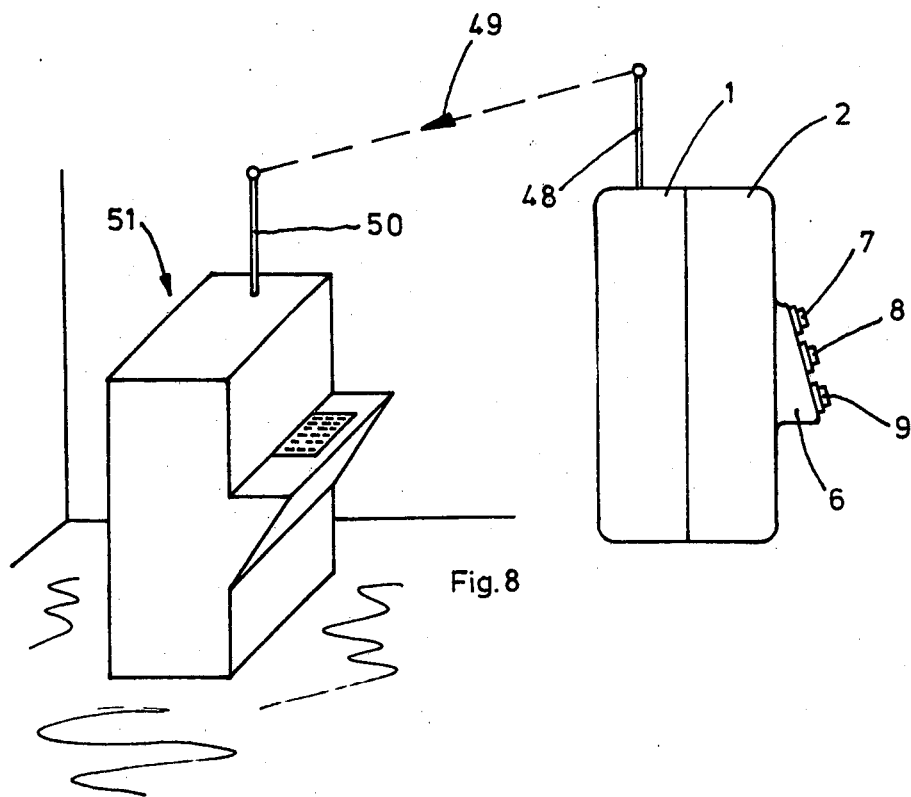

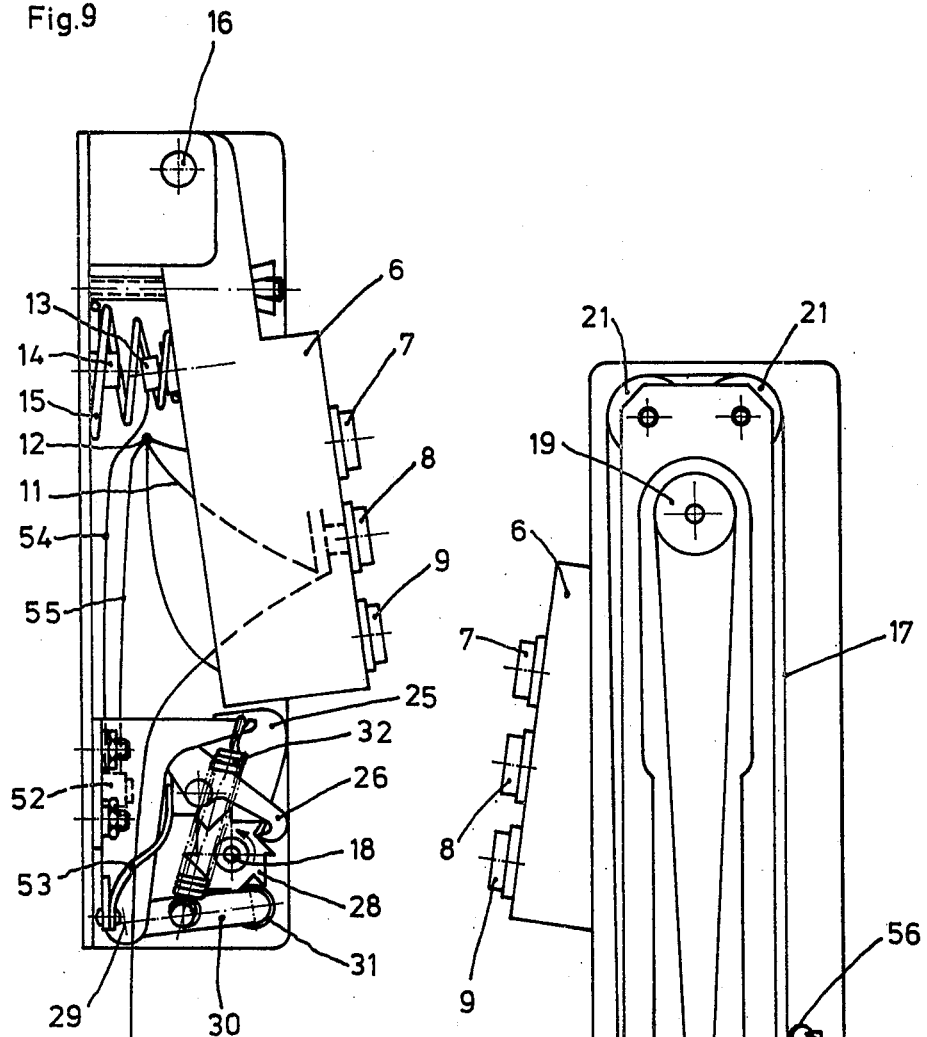

APPARATUS FOR DIAGNOSING A TECHNICAL OBJECT, ESPECIALLY A MOTOR VEHICLE

This is a continuation, of application Ser. No. 167,287, filed July 29, 1971 now abandoned.

FIELD OF THE INVENTION

The present invention relates to an apparatus for diagnosing a technical object according to a checking program or list.

BACKGROUND OF THE INVENTION

During the inspection of motor vehicles there might be a need for an apparatus to perform the diagnosis of the vehicle without much instrumentation and without requiring a complex procedure, but still enabling the visual and manual checking thereof in a reliable fashion, and record and retain the results of such checks in the form of a written diagnosis report. Inasmuch as the checking list might be quite extensive and may include some fifty check points, there is more ground to believe that from the view point of safety one should not rely alone on the memory of the mechanic performing the checking.

SUMMARY OF THE INVENTION

It is, therefore, an object of the present invention to provide an apparatus for use in the diagnosis of a technical object, such as a motor vehicle, wherein such diagnosis or check is performed in a predetermined checking sequence and wherein a large number of points are to be checked and the findings recorded in the form of a check report.

According to the present invention, the diagnosis apparatus which can be applied not only to motor vehicles but also to machines where a periodic check becomes necessary within a manufacturing process, comprises an information storage device which is coupled with a manually operable portable control device having signal keys thereon, such coupling being over a plurality of information channels, and wherein the operating element of a transmitting device for the transmission of the information as to the particular checking points of the program, as well as to the next in line checking point, constitute a physically observable sequence switching means.

According to the present invention the information storage device which can be in the form of a recorder executing the checking report, is separated from the manually operable portable control device. This fact makes it possible that the person performing the checking, for example, of a motor vehicle from a position underneath the motor vehicle, can relay the checking information onto the information storage device which is set up at a different location, protected and not used for other purposes, such as a checking room or a checking wall.

The control device is constructed in such a manner that it is capable of performing at least the following three functions:

First the control device comprises a transmitter means for the transmission of the checking information reported by the person performing the checking. This information always relates to a particular check point of a predetermined checking program. The selection of the checking point is always performed necessarily by the control device, wherein the person performing the checking receives acoustical or optical indication as to the checking point next in line. For this purpose there is a sequence switching arrangement operated by the signal keys. In the general form of the present invention the control device delivers information over the sequence switching arrangement for the switching of the information storage device to the check point in the checking program, so that by means of a centralized control the necessary synchronism between the control device and the information storage device is retained. Basically, it would be sufficient if the information storage device itself would have a sequence switching arrangement which, upon the termination of the storage process, that is for example, after the taking down of the checking information for a predetermined check point, upon receiving signals from the information storage device, could directly perform the sequence switching right there.

In the preferred embodiment of the invention which has a small easily operable appearance, the sequence switching arrangement in the control device comprises a tape recorder containing the checking program and a mechanism for a stepwise switching of the tape and a selector means reproducing in a physically observable fashion the instantaneous checking point. The selector means should be understood to include a device which enables the selective indication of a single checking point optically or acoustically. In the event the storage tape is an audio tape, the selector means will comprise a magnetic head - loudspeaker combination. The construction of the selector means is especially simple when the storage tape is in the form of a writing strip having lines thereon running transversely with respect to the strip feed or switching direction, and each line of which is assigned to a check point of the checking program. In this case the selector means comprises a window in a housing portion of the control device, the window aperture being covered in the housing portion by means of a lenslike magnifying member of glass or transparent material.

As mentioned above, the checking information delivered to the storage device by means of the signal keys and assigned to a particular checking point must also operate the sequence switching device. In an embodiment of the present invention considering this dual function of the signal keys, there is provided that the signal keys are arranged on a common rocking means, such as a rocking platform, which constitutes a part of the sequence switching mechanism. As soon as one of the signal keys is depressed, simultaneously therewith there occurs a rocking of the platform which, as mentioned above, being an essential element of the sequence switching mechanism for the storage tape as well as for the information storage device, performs the switching forward of the apparatus. Due to the fact that the rocking platform is assigned to or associated with all signal keys or buttons, the switching forward cannot be omitted; it occurs always automatically and irrespective of whether one or another of the keys has been depressed.

It should be noted that for the purposes of diagnosis in most cases it is sufficient to provide only a pair of signal keys or buttons, one of which effects the delivery of the signal "good" and the other the signal "bad" upon its operation. It is, however, within the scope of the present invention to add a third signal key to the above combination which in itself is a mere forward switching key, that is, in the case of a tape or strip of material which carries the information in lines, upon operation of the third button or key, a shift to a new line occurs without delivering any kind of information to the information storage device. This key is depressed in case the particular check point should be omitted according to the checking list.

Considering the embodiment of the present invention wherein the signal keys or buttons are arranged in the common rocking means or platform, the coupling between the rocking means and a driving shaft of the sequence switching mechanism for the storage tape can be had in the form of a well known ratchet and wheel arrangement. The rocking means can be journalled or coupled with the sequence switching mechanism in such a manner that an accidental light pressing on the rocking means will not cause a switching from one check point to the next check point.

Conversely, it is also possible and purposeful to provide a safety arrangement which prevents that an unintended light pressing of one or more of the signal keys would send a signal to the information storage device. The construction of the control device having a rocking means according to the present invention proves itself advantageous also from this view point, since such safety function is accomplished in a simple manner by the transmitting means having circuits with contacts of the signal keys therein and a further contact means being arranged in such relation to the rocking means that the transmitting means operate only when the rocking means has been rocked or tilted. This embodiment of the present invention may be constructed in such a manner that the further contact means common to all circuits lies in a common node or joint of such circuits.

It is within the scope of the present invention to construct the sequence switching mechanism with electromagnets, in the excitation circuits of which there are provided the contacts for all signal keys. Under this condition during the operating state, the circuits have parallel current branches in which the contacts of the signal keys constructed in the form of operating contacts are placed in such a manner that during the pressing of a key the electromagnets receive currents and effect the switching further. It is preferred in connection with this embodiment of the present invention that each signal key has at least a pair of switches assigned to it of which pair one effects the delivery of the signal to the information storage device, while the other effects the closing of the excitation current circuit for the electromagnets of the sequence switching mechanism.

With respect to the construction of the transmitting means and the information channels there are a plurality of possibilities. For example, the transmitting means can be constructed by means of the contacts of the individual signal keys and by means of the circuits associated with such individual keys, which then are coupled by conductors leading to the information storage device over the information channels. In case such a coupling by means of conductors between the control device and the information storage device appears to be disturbing or inconvenient, the transmitting means can be constructed as a high frequency transmitting device which transmits the high frequency signals when the contacts of the individual signal keys are operated over a plurality of wireless information channels to the information storage device.

It has been found especially advantageous from the view point of servicing and operation that the signal keys and the selector means are placed on a wall portion of the control device. In this case, during the operation all the parts of interest of the control device may be visually observed. Also the shape of the housing of the control device has a certain importance in the overall diagnostic procedure. For example, the housing of the control device can be made in form of a box which may be held in one hand and the signal keys may be arranged in such box within the reach of one's thumb of the same hand holding the box, so that the other hand remains completely free to perform the inspection. Considerably more freedom becomes available for the arrangement of the remaining active parts of the control device if the housing of the control device is provided with a handle for a single hand, similar to the handle on movie cameras. Also in this case the signal keys are placed within the reach of the thumb of the hand engaging the handle. While in the first mentioned embodiment, without the handle, the selector means and the signal keys are placed on one of the larger surfaces of the box which according to the present invention has a longitudinally extending shape so that one's hand could conveniently and safely hold the control device, in the last described embodiment in which the housing is again in the shape of a longitudinal box, the handle is secured to one of the larger surfaces of the box while the selector means and the signal keys are provided on one of the smaller surfaces of the housing.

BRIEF DESCRIPTION OF THE DRAWINGS

The present invention will be more readily apparent from the following description of preferred embodiments thereof shown in the accompanying drawings, in which:

FIG. 5 is a side view similar to FIG. 2, except from the opposite side of the control device; and FIG. 6 is a perspective view of the control device with a handle arrangement.

FIG. 7 is a schematic illustration of the portable control device according to the present invention and an output printing means coupled therewith;

FIG. 8 is a similar arrangement as FIG. 7, however, with wireless coupling between the portable control device and the output printing means;

FIGS. 9 and 10 are illustrations of the portable control device according to the present invention in side elevation, partly in section, similar to FIGS. 4 and 5.

DESCRIPTION OF THE PREFERRED EMBODIMENTS

Considering now the control device illustrated in

FIGS. 1–5, it is seen that the active parts or elements of the device are placed in a longitudinally shaped box-like housing which in the illustrated embodiment comprises two halves 1 and 2, held together by means of a hinge at the upper front surface in the figures. The lower front surface of the housing half 1, as seen in the figures, is passed through by a cable 3 which contains the information channels in the form of electric conduits or conductors and which is returned to an information storage device, such as a paper recording device set up in a guarded place of the checking station. The information storage device is shown in FIGS. 7 and 8. Said recording device operates in synchronism with the control device, so that the checking information received over the cable 3 is recorded in the proper lines of a check report having a predetermined form.

Figure 1:
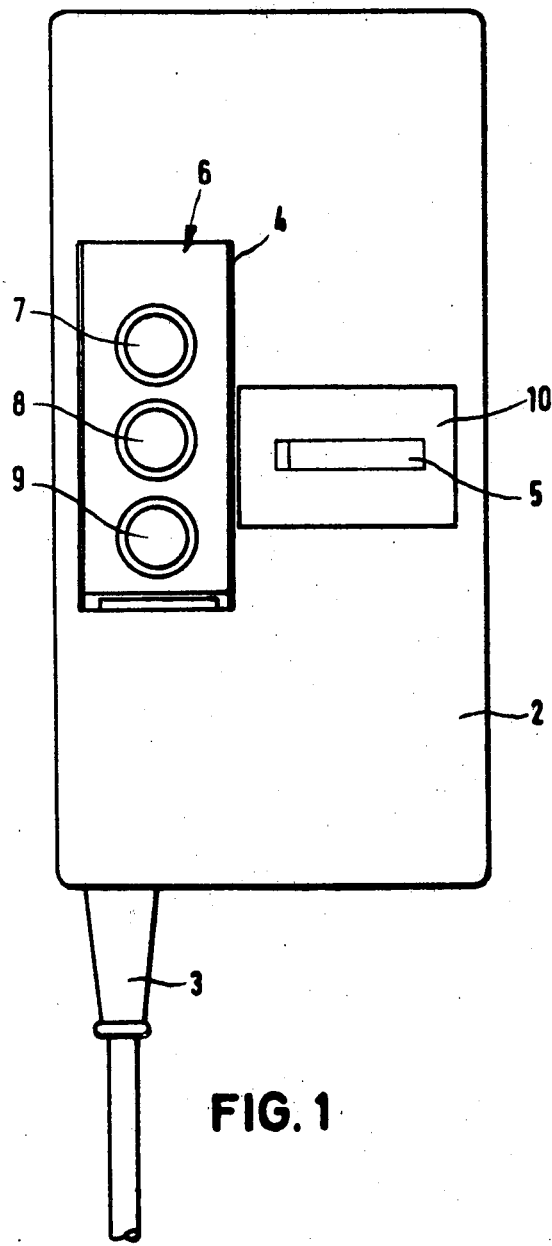
FIG. 1 illustrates in a perspective view the control device according to one embodiment of the present invention.
Figure 2:
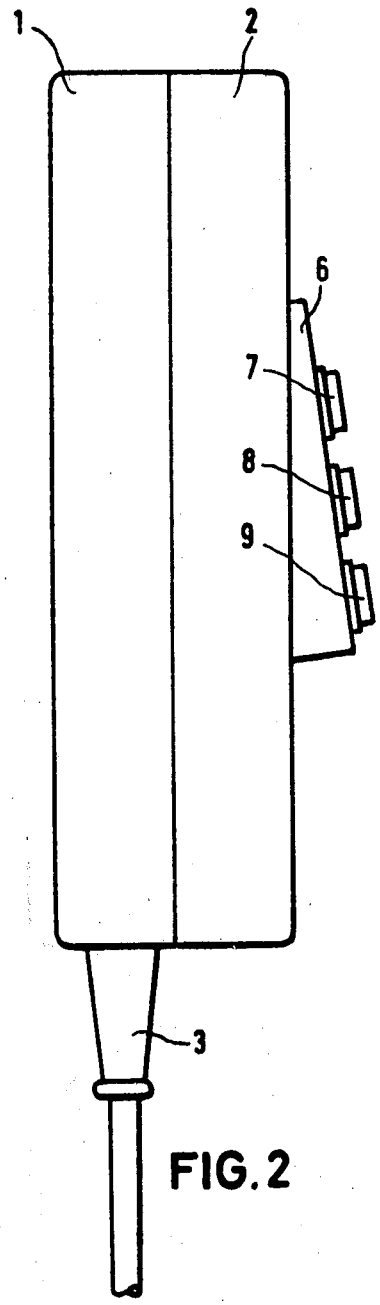
FIG. 2 is a side view of the device according to FIG. 1.

The other housing portion or half 2, as seen in FIG. 1, has a pair of recesses 4 and 5 formed therein, one of which serves for the receiving of a rocker means or platform 6 for supporting the three signal keys 7–8, while the other recess 5 forms the selector means indicating optically the check point of the checking program which at that particular instant is being considered. This selector means comprises also a lens-like arched window pane 10 covering the recess and which magnifies the checking point indicated at that instant.

The rocking means 6 having the signal keys thereon, the key 9 thereof being associated with the information "good," the key 8 with the information "bad" and the key 7 with the command "new line" or "change the line," are arranged within the reach of the thumb of the hand holding the control device. In the event a control device is held with the right hand, it is possible that the first three fingers of the hand also operate the various signal keys. The structuring of the control device according to the present invention which enables the application of the same hand to support the control device as well as to operate the signal keys thereof, offers the advantage that the other hand of the person performing the checking remains free for the actual checking procedure or even for preparing notes.

Figure 3:
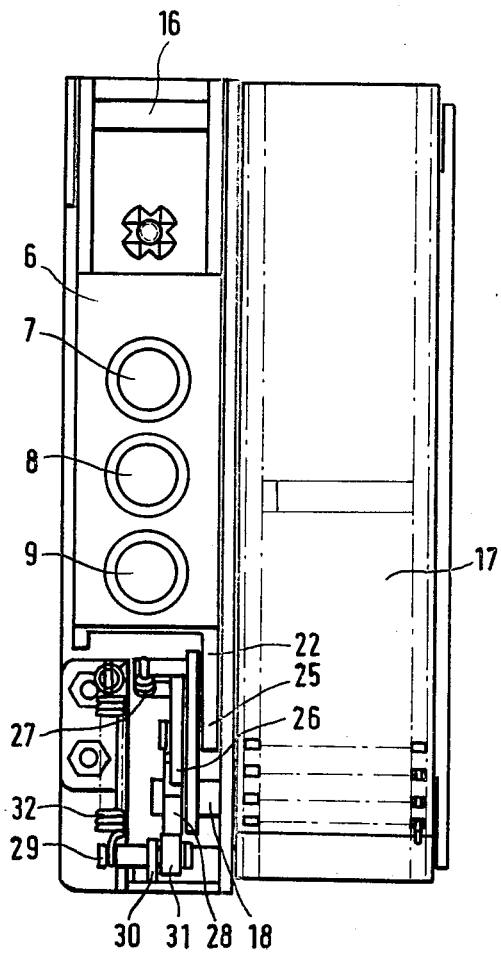
FIG. 3 is a view similar to FIG. 1, with parts removed to show some inner elements of the control device.
Figure 4:
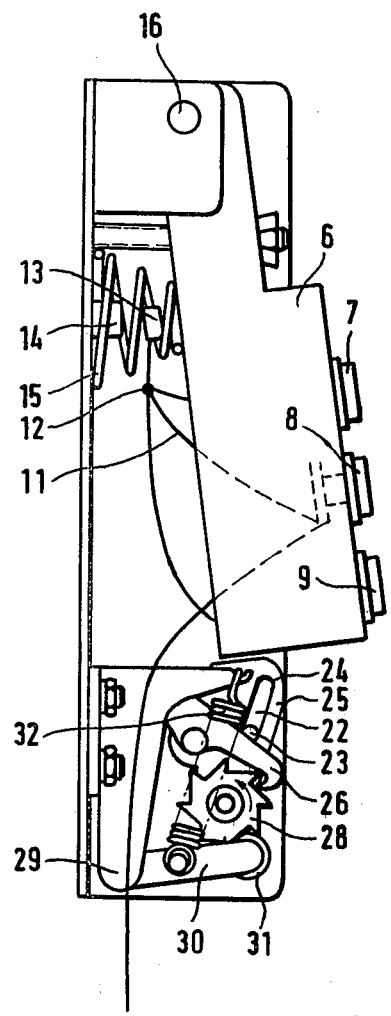
FIG. 4 is a view similar to FIG. 2, with some housing portions removed to illustrate the inside of the control device.
Figure 4A:
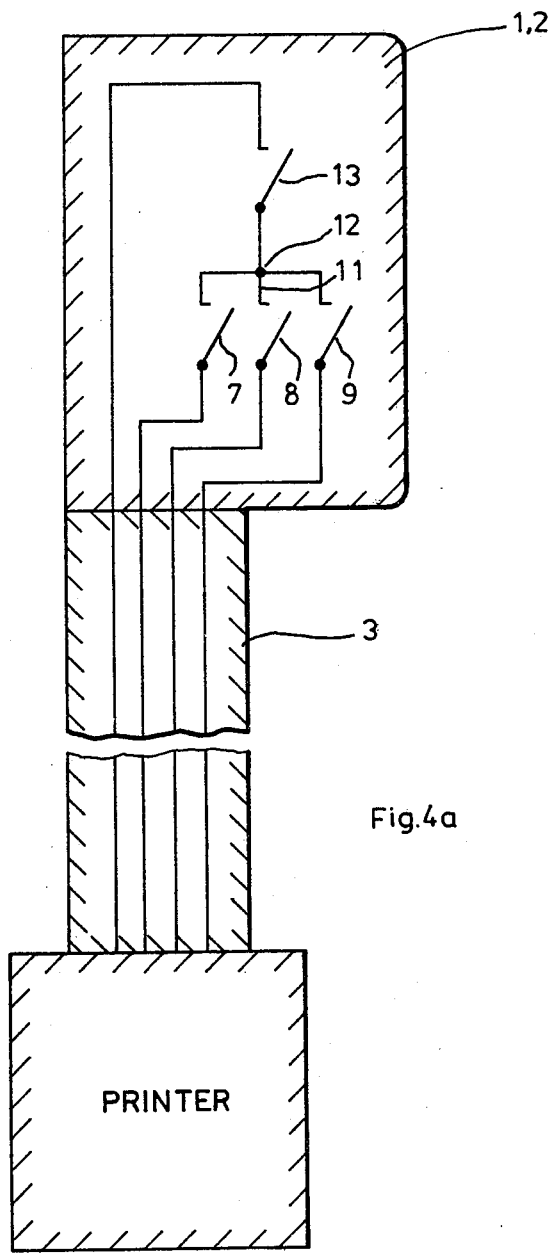
FIG. 4a is a schematic wiring diagram for the contents of the signal keys of the control device.

Considering now, with reference to FIGS. 3, 4, 4a and 5, the inner structure of the control device, it is seen that it is divided into a transmitting means for the transmission of the checking information to the information storage device and into a sequence switching means for sequencing the checking program. The transmitting means of the present embodiment is constructed in a simple manner. It comprises in the illustrated embodiment three electrical circuits each of which includes a contact of one of the signal keys 7, 8 and 9. These contacts are operating contacts, so that upon depressing one of the signal keys 7, 8 and 9, the associated circuit is closed as can be seen in FIG. 4a. The resultant current flow in one of the circuits will operate the output printing or writing mechanism in the information storage device, so that an appropriate information will be typed or printed into the check report. If, for example, the signal key 8 is depressed, the associated current circuit is closed and the information storage device will print into the checking report, for instance, that the check of the foot brake shows a result which is bad.

Such circuit is illustrated only for the above described signal key 8 in FIG. 4 and designated by reference numeral 11. It is seen that reference numeral 12 identifies a node or joint from which the corresponding conductors start to the switches of the signal keys 7 and 9. The reason for this is that to all three circuits a common contact 13 is assigned which will engage the counter contact 14 of it only upon the operation of the rocker means 6, and then brings about a grounding or commoning of all circuits. This means that only when the bridge or rocker means 6 is pivoted or rocked against the force of a spring 15 fully about its axis 16, will the pressing of one of the signal keys 7, 8 and 9 effect delivery of an information onto the information storage device.

The sequence switching device comprises as an essential element a storage tape in the form of an endless strip 17 on which the individual checking positions are recorded in the form of words, and which is perforated in a known manner and is fed or operated by a sprocket wheel journalled for rotation on a driving axle 18. The driving or guiding of the storage tape 17 can be especially well seen in the side view representation of FIG. 5. In order to be able to accommodate a relatively large volume of storage tape in a small space, the tape is guided over rollers 19, 20 and 21 in such a manner that it practically describes a path following a pair of Us placed into each other.

The storage strip 17 must be switched forward in a stepwise fashion so that in the region of the selector 5 the various checking positions become apparent one after the other. For this purpose the rocker means 6 has a projection 22 with which, when it is actuated, it will operate on a ratchet mechanism coupled with the driving axle 18 of the sequence switching mechanism. The projection 22, as seen in FIG. 4, has a stud 23 which protrudes into the slot 24 of the ratchet support 25. The ratchet 26 is pivotally secured on the ratchet support 25 and, as seen in FIG. 3, it is supported by means of a spring 27 is engagement with the ratchet wheel 28 on the driving axle 18 of the storage tape 17. The axle 18 embraces also the ratchet support 25 so that it cannot be pivoted by the spring 27, as it supports the ratchet 26 only in engagement with the ratchet wheel 28.

In order that the switching forward occurs in a predetermined sequence, a latching mechanism comprising a latching lever 30 pivotably mounted at 29 and carrying a roller 31 at its free end, is provided and is in lasting engagement with the ratchet wheel 28 by means of a tension spring 32. In the event the rocker means 6 is fully depressed as a result of the intentional operation of one of the signal keys 7, 8 and 9, the ratchet support 25 is pivoted by means of the stud 23 about the operating axle 18 and carries also with it the ratchet 26 resting or being journalled on it and which, in turn, will shift the ratchet wheel 28 against the force exerted on the roller 31 under the effect of the spring 33 by a certain angular distance. The roller 31 will fall into the next tooth recess of the wheel 28 so that, when the rocking means 6 is released, the ratchet 26 under the spring bias indicated at 27 will retreat over the slanted tooth side and will fall into the position illustrated in FIG. 4 which is behind the steep tooth flank. Now the control device is ready for the checking of the next checking position.

FIG. 6 illustrates another embodiment of the control device according to the present invention, the inner structure of which can be similar to the one described above. The indication of the instantaneous checking point is performed optically through a window 40 of the housing 41 of the control device by means of the selector formed by the lens-like cover 42. The embodiment according to FIG. 6 differs from the embodiment illustrated in FIGS. 1-5 in that a handle 43 is provided for a single hand on the lower large surface of the box-like housing 41, as seen in FIG. 6. Again three signal keys 44, 45 and 46 are provided and this time on a front surface of the housing 41 carrying also the selector 40, 42 and are within reach of the thumb of the hand holding the control device.

The information channels which are necessary to transmit the checking results are substantially described herein-above and more specifically with reference to the conduit or cable 3. It is, however, feasible to omit the conduit 3 and replace it with the wireless transmission as illustrated in FIG. 8. It is, however, noted that whether a physical conduit is involved or not, the meaning of the term information channel covers conduits as well as wireless transmission paths.

Referring now to FIG. 7, it illustrates the above described portable control device connected to the printer or output device 47 over an information channel, such as a cable.

The switching further of the printer 47 to the next line or column in synchronism with the operation of the switching means of the portable control device can be performed in two different ways. Conventionally, a printer of the above described type is provided with a forward switching arrangement which, after a line has been typed, automatically performs a further switching or line change of the printer. Such arrangement operates similarly to a conventional teletype machine in connection with which it is well-known that after the completion of a line, it automatically switches to a new line. The invention provides, however, that upon actuating the switching arrangement there are signals produced also within the portable control device itself which are fed through the information channel, through the cable 3 there, to the printing device 47 and perform the further switching of the printer to another line or column.

Referring now to FIG. 8, it illustrates again in the right side of the figure, the already described portable control device which, however, in this embodiment is provided with a radio transmitter and consequently with an antenna 48, so that it could deliver high frequency signals 49 to the antenna 50 of the printing device 51.

In connection with FIGS. 7 and 8 it is noted that the printers 47 and 51 and the portable control devices associated with the respective printing devices, can be set up at any remote location with respect to each other, which is illustrated by the broken representation of the cable 3 in FIG. 7 and, by the obvious broken representation of the wireless transmission path between the portable device and the printer 51 in FIG. 8.

Referring now to FIG. 9, it illustrates the portable control device in a view similar to the view of FIG. 4. The control device as illustrated in FIG. 9 differs with respect to the illustration of the control device in FIGS. 3 and 4 in that the projection 22 of the rocking means 6 and the pin 23 carried thereby have been replaced by a strong electro-magnet 52 which causes a pivoting of the ratchet support 25 about the axle 18 against the effect of a leaf spring 53.

Furthermore, in the embodiment of FIG. 9 the coupling of the nodal point 12 with the contact 13 will cause an energization of the electro-magnet 52 over a conductor 54 and 55, so that when the rocking means 6 is operated, it is pivoted to an extent that the contacts 13 and 14 lie upon each other; then the electro-magnet 52 will be energized and the ratchet support 25 will be pivoted about the axle 18. After this the same result is obtained as with the contruction of the portable device according to the embodiments illustrated in FIGS. 3 and 4. In other words, the ratchet or pawl 26 is coupled by the rocker 6 not mechanically, as is the case with the embodiments of FIGS. 3 and 4, but during the actuation of the rocker 6, an energizing circuit for the electro-magnet 52 is closed, so that the electro-magnet 52 will operate the pawl 26. Such electro-magnetically operated step switching devices are well-known in the field of telephony.

Referring now to FIG. 10, it illustrates the portable control device having a magnetic tape 17 on which, in successive regions thereof, the checking status to be performed by the mechanic, such as by having been previously dictated thereon, the above described further switching arrangement of the control device causes the magnetic tape 17 at each actuation of the rocker 6 to be switched further by a certain amount during which it will pass over the recording magnetic head 56 in which, in a well-known manner, currents are induced, and which subsequently, over conductors 57 and 58, are transmitted to the loud speaker unit 59. The loud speaker unit 59, which is placed at the lower portion of the housing, behind a grid cover, will inform acoustically the mechanic performing the checking about the next checking step he should perform. The various signal keys can be made in different form and shape so that differentiation is possible between them during the checking.

A further signal key could also be provided which could lie in the circuit of a step-motor positioning the device into its first checking position and which would be operated when a person performing the checking gave the wrong information to the control device.

From the above it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desire to be secured by Letters Patent, is as follows:

1. An apparatus for performing the diagnostic checking of a technical object, such as a motor vehicle, according to a predetermined checking program formed by a sequence of checking points, comprising
    a manually operable portable control device having a housing formed in the shape of a box adapted to be held by a single hand, at least a pair of signal keys associated with a state of the instantaneously performed checking point disposed on the same housing side of said control device,
    an information storage device remotely displaced from said control device and adapted to store checking result data for said checking points,
    information channels for said checking result data between said control device and said information storage device, electrical contact means arranged in said housing and operable by said signal keys, said contact means lying in electrical circuits for delivering electrical signals representing said checking result data to said information channels upon actuation of one of said signal keys, checking point identification means in said control device comprising a printed tape carrying checking point identifications on lines running transversely with respect to the longitudinal dimension thereof, means for stepwise advancing said tape, and a window provided in the housing on said same side thereof and adapted to show one line of said tape, said means for advancing including movable means connected to all of said signal keys, such that actuation of any of said signal keys causes operation of only the associated one of said contact means as well as advancing said tape to identify the checking point to be performed next in conformity with said sequence.

2. The apparatus as claimed in claim 1, wherein said means for advancing comprises electromagnet means comprising contact means associated with each of said signal keys, said contact means being in the excitation of said electromagnet means.

3. The apparatus as claimed in claim 1, wherein said information channels are coupled to said information storage means by means of high frequency information channels without physical connection thereto.

4. The apparatus as claimed in claim 1, wherein said information storage means is a printout device.

5. An apparatus for performing the diagnostic checking of a technical object, such as a motor vehicle, according to a predetermined checking program formed by a sequence of checking points, comprising a manually operable portable control device having a housing formed in the shape of a box adapted to be held by a single hand, at least a pair of signal keys associated with a state of the instantaneously performed checking point disposed on the same housing side of said control device, an information storage device remotely displaced from said control device and adapted to store checking result data for said checking points, information channels for said checking result data between said control device and said information storage device, electrical contact means arranged in said housing and operable by said signal keys, said contact means lying in electrical circuits for delivering electrical signals representing said checking result data to said information channels upon actuation of one of said signal keys, checking point identification means in said control device comprising a printed tape carrying checking point identifications on lines running transversely with respect to the longitudinal dimension thereof, means for stepwise advancing said tape, and a window provided in the housing on said same side thereof and adapted to show one line of said tape, said means for advancing being operatively connected to all of said signal keys, such that actuation of any of said signal keys causes operation of only the associated one of said contact means as well as advancing said tape to identify the checking point to be performed next in conformity with said sequence, said means for advancing comprising a rocking means, all said signal key means being arranged on said rocking means for effecting a pivoting thereof when actuated.

6. An apparatus for performing the diagnostic checking of a technical object, such as a motor vehicle, according to a predetermined checking program formed by a sequence of checking points, comprising a manually operable portable control device having a housing formed in the shape of a box adapted to be held by a single hand, at least a pair of signal keys associated with a state of the instantaneously performed checking point disposed on the same housing side of said control device, an information storage device remotely displaced from said control device and adapted to store checking result data for said checking points, information channels for said checking result data between said control device and said information storage device, electrical contact means arranged in said housing and operable by said signal keys, said contact means lying in electrical circuits for delivering electrical signals representing said checking result data to said information channels upon actuation of one of said signal keys, checking point identification means in said control device comprising a printed tape carrying checking point identifications on lines running transversely with respect to the longitudinal dimension thereof, means for stepwise advancing said tape, and a window provided in the housing on said same side thereof and adapted to show one line of said tape, said means for advancing being operatively connected to all of said signal keys, such that actuation of any of said signal keys causes operation of only the associated one of said contact means as well as advancing said tape to identify the checking point to be performed next in conformity with said sequence, said means for advancing comprising a rocking means, all said signal key means being arranged on said rocking means for effecting a pivoting thereof when actuated, said means for advancing further comprising a driving axle and a ratchet mechanism coupling said rocking means to said driving axle.

7. The apparatus as claimed in claim 6 comprising a further contact means associated with said rocking means, the contact arrangement being such that said information channels become actuated only upon operation of the further contact associated with said rocking means and actuated only by said rocking means being pivoted.

* * * * *